C. L. BEST.
TRACTOR ENGINE.
APPLICATION FILED JAN. 18, 1913.
1,194,269.
Patented Aug. 8, 1916.
3 SHEETS—SHEET 1.
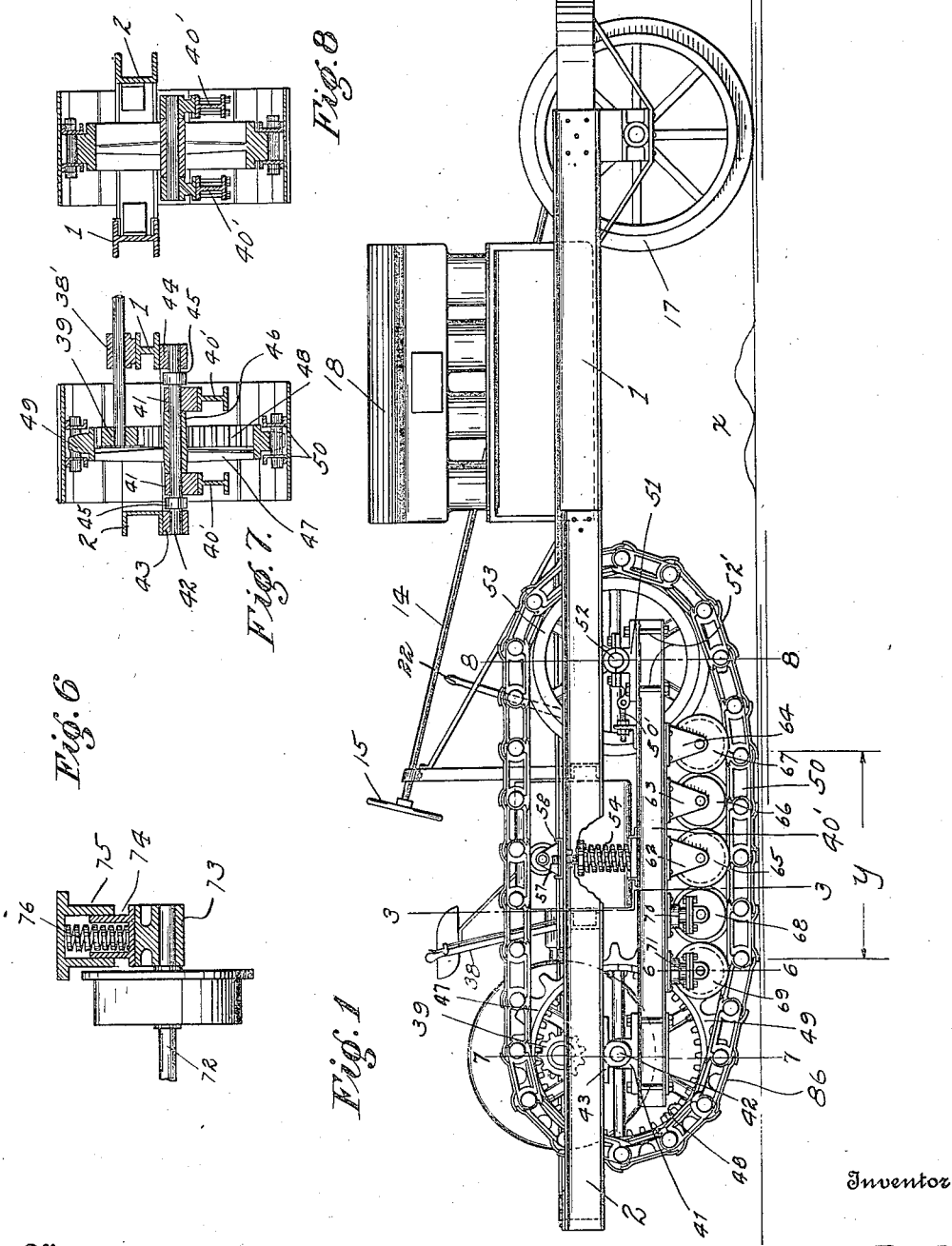
Witnesses
C. A. Stock
Frank H. Carter
Inventor
Clarence Leo Best
By Harry C. Schweder
Attorney

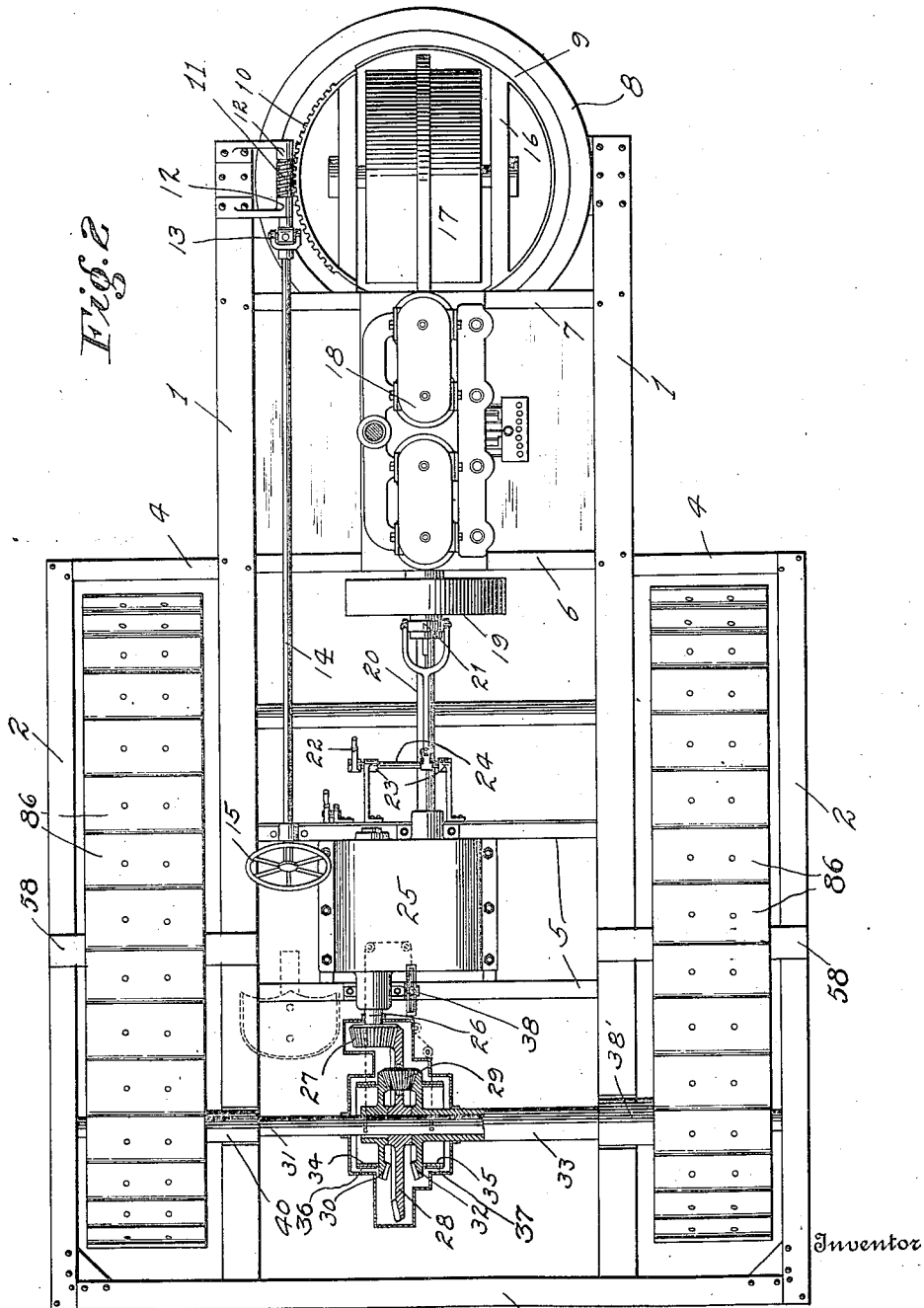

C. L. BEST.
TRACTOR ENGINE.
APPLICATION FILED JAN. 18, 1913.
1,194,269.
Patented Aug. 8, 1916.
3 SHEETS—SHEET 3.
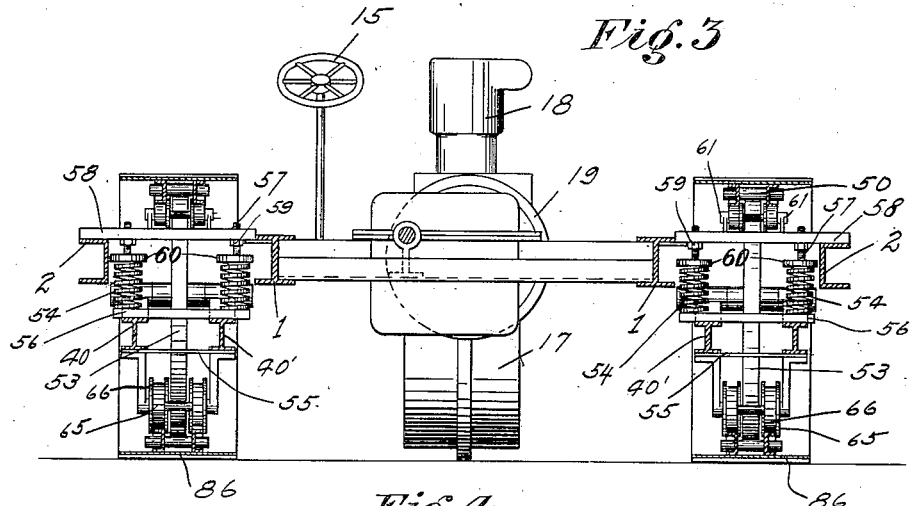
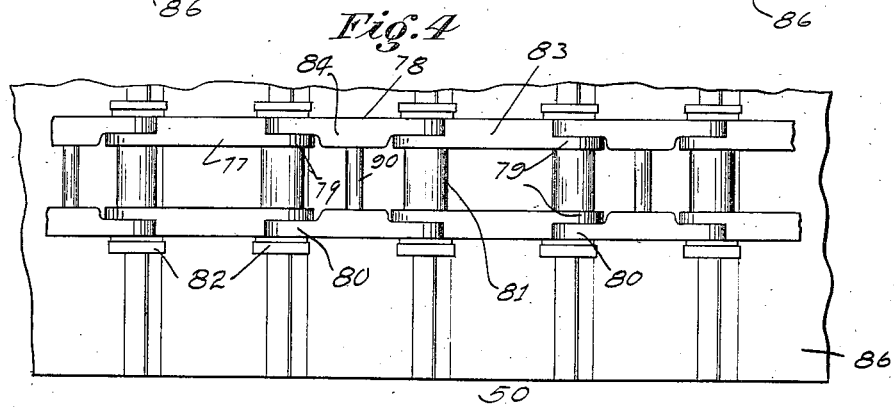
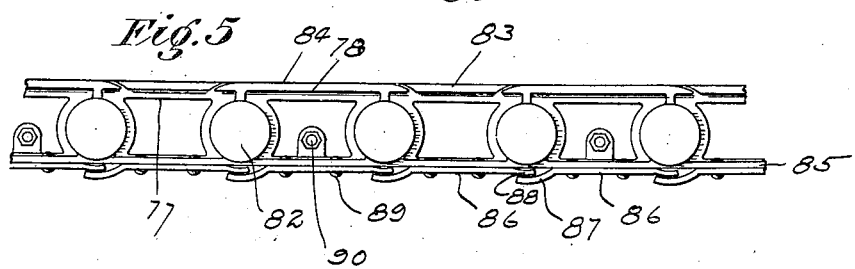
Witnesses
Inventor
Clarence Leo Best
By Harry C. Schroeder
Attorney

UNITED STATES PATENT OFFICE.

CLARENCE LEO BEST, OF SAN LEANDRO, CALIFORNIA.

TRACTOR-ENGINE.

1,194,269.  Specification of Letters Patent.  Patented Aug. 8, 1916.

Application filed January 18, 1913. Serial No. 742,909.

*To all whom it may concern:*

Be it known that I, CLARENCE LEO BEST, a citizen of the United States, residing at San Leandro, in the county of Alameda and State of California, have invented certain new and useful Improvements in Tractor-Engines, of which the following is a specification.

The object of this invention is to provide an auto tractor engine having a steering wheel or wheels and endless tractor belts or chains which are so mounted as to provide for yielding movement without buckling the frame or lifting the steering wheel and wherein the imposition of the load is effective to obtain tractive action throughout the length of engagement of the tractive belt or chain with the surface on which the same is running.

In the most improved embodiment of my invention, the tractive chain or belt runs upon wheel and radius tractor trucks which are pivotally connected with the frame of the tractor or engine so as to permit of yielding up and down movement of the front portions of radius tractor trucks, with respect to the frame.

Other features of novelty will be more fully described in connection with the accompanying drawings, and will be more particularly pointed out in and by the appended claims.

In the drawings:—Figure 1 is a view in side elevation of a tractor engine embodying one form of my invention. Fig. 2 is a plan view thereof. Fig. 3 is a sectional view on line 3—3 of Fig. 1. Fig. 4 is a plan view of a portion of one of the chains. Fig. 5 is a side elevation thereof. Fig. 6 is a sectional view on line 6—6 of Fig. 1. Fig. 7 is a sectional view on line 7—7 of Fig. 1. Fig. 8 is a sectional view on line 8—8 of Fig. 1.

Like characters of reference designate similar parts throughout the different figures of the drawings.

As illustrated, the main frame of the tractor includes longitudinal frame members 1, lateral frame members 2 and a rear transverse frame member 3 together with additional transverse frame connecting members 4, 5, 6 and 7, as clearly shown in Fig. 2.

At the front ends of the longitudinal members 1 an annular guide 8 is rigidly mounted and a fifth wheel ring 9 is rotatively mounted in said guide 8. The ring 9 is provided with teeth 10 adapted to mesh with a worm 11 journaled in be rings 12, which may be secured to one of the frame members 1. The worm 11 may be connected by a universal joint 13 with an operating shaft 14 extending rearwardly toward the driver's seat and provided with an operating wheel 15. The ring 9 constitutes a part of a journal frame 16 in which a steering wheel 17 is mounted.

It will be readily seen from the foregoing that by rotation of the operating wheel 15 the steering wheel 17 may be controlled to guide the tractor in the desired direction of travel.

A suitable prime mover 18 is mounted on transverse frame members 6 and 7 and is provided with a fly wheel 19. The prime mover may be in the form of an explosive engine with the fly wheel 19 connected with the engine shaft and adapted for connection or disconnection with and from a transmission shaft 20 by means of any suitable form of clutch generally designated at 21. The clutch 21 may be operated by a lever 22, accessible to the driver. Bearings 23 serve to support the lever shaft 24, as shown. The transmission shaft 20 is connected with any suitable form of speed change transmission mechanism 25, and the drive shaft 26 from said transmission mechanism 25 is provided with a bevel gear 27 which meshes with the main wheel 28 of a differential gear mechanism. The main wheel 28 carries a revolubly mounted bevel wheel 29 which meshes with a bevel wheel 30, on drive shaft 31, and which also meshes with bevel wheel 32 on sleeve 33. Sleeve 33 is revolubly mounted on drive shaft 31. Bevel wheels 30 and 32 are provided with brake drums 34 and 35, respectively, and band brakes 36 and 37, on said drums, are adapted for connection and operation by a lever 38 for alternate operation of the brake bands upon adjustment of the lever 38 in opposite positions. The object is to assist in retarding one of the bevel wheels 30 or 32 to assist in turning the machine.

Sleeve 33 is mounted in a bearing 38' disposed on one of the frame members 1, and a pinion 39 is mounted on the end of said sleeve. The shaft 31 extends throughout the length of said sleeve 33 and on the opposite end of said shaft 31 is mounted a pinion similar to pinion 39. Shaft 31 is mounted in a bearing 40, as shown in Fig. 2.

I will now describe the tractor belt and the radius tractor truck and wheels, one of such set of mechanisms being disposed on opposite sides of the tractor, outside of the frame members 1, and as both sets of mechanism are alike in all respects, I will only describe the mechanism on the lower side of Fig. 2.

Each radius tractor truck is shown as consisting of parallel and suitably spaced and braced I-beams 40' on the rear ends of which are mounted journal bearings 41. A pivot shaft 42 is mounted in said bearings 41 and the pivotal connection of the tractor truck with the frame is effected by journaling the ends of shaft 42 in a bearing 43 on the lateral frame member 2 and in a bearing 44 on the longitudinal frame member 1. The shaft 42 may be provided with collars 45 disposed between the bearings to keep the same in proper spaced relation. Between the bearings 41 is disposed a hub 46 of a driven wheel 47. The driven wheel 47 is provided with interior teeth 48 meshing with pinion 39 and exterior sprocket teeth 49 for driving chain 50, which is one of the tractor chains.

On the front end of the radius tractor truck I provide bearings 51 for the shaft 52 of an idler wheel 53. The bearings 51 may be secured to the I-beams 40' by bolts 52', extending through the flanges of beams 40', and the openings may be sufficiently enlarged to provide for longitudinal adjustment of the bearings 51 on the I-beams 40' to provide for tightening the chain 50. Any suitable form of adjusting device may be provided such as is generally indicated at 50.'

It will be seen from the foregoing that the chain 50 runs upon the driven wheel 47 and the idler 53 and that the tractor truck including the I-beams 40', is pivotally connected with the frame by shaft 42.

The belt frame resiliently supports the main frame of the machine, preferably between the centers of the pivot shaft 42 and the idler shaft 52 and I preferably provide load carrying springs 54 for this purpose.

As will be seen by reference to Fig. 3, the I-beams 40' are braced from below, by brace plates 55, and on the top of said I-beams 40' I provide transverse channel iron braces 56. Springs 54 are seated on the channel braces 56. Rods 57 are threaded or tapped into a transverse channel 58 which is mounted upon the frame members 1 and 2. Lock nut 59 serves to lock the rods 57 and spring seat cup 60, threaded on the rods 57, take the stress from said springs 54 and transmit it to the rods 57 and therethrough to the transverse channel 58 and the frame members 1 and 2, so that any upward movement of the radius tractor truck about the pivot shaft 42 is yieldingly resisted by springs 54 interposed between the radius tractor truck and the frame.

An upper chain supporting idler, or idler wheels, are mounted in bearings 61 disposed on channel 58 to support the chain belts at points between the driven and idler wheels 47 and 53, respectively. The driven and idler wheels 47 and 53, respectively, are not relied upon to engage the tractive chain belt with the road surface as they principally serve to act as operating and idler wheels for guiding the chain belt throughout a predetermined course.

Between the driven and idler wheels rotative means is provided for causing engagement of the tractive chain belt with the road surface and such means functions as a supporting means between the tractive chain belt and the radius tractor truck.

In the form shown, journal brackets 62, 63 and 64 are mounted on the lower faces of the I-beams 40', in pairs, and the supporting brackets 62, 63 and 64 carry pairs of supporting wheels 65, 66 and 67, respectively. In the rear of wheels 65, 66 and 67 I may provide pairs of wheels 68 and 69 which are yieldably connected with the I-beams 40', by journal brackets 70 and 71, respectively. The yielding journal brackets are shown in detail in Fig. 6 wherein it will be seen that the shaft 72 is mounted in a journal 73 on which is rigidly disposed a cup spring seat 74. The cup spring seat 74 telescopes a companion cup spring seat 75 which is rigidly secured to I-beams 40'. A spring 76 is interposed between said cup, as clearly shown in Fig. 6.

The front pairs of wheels 65, 66 and 67 are rigidly connected with the I-beams 40' because of the yielding action afforded by springs 54 to the forward ends of the beams 40'. Rearwardly of the springs 54 the yielding action is reduced to a minimum and therefore I desirably provide yielding mountings for the pairs of wheels 68 and 69. By reference to Fig. 1 it will be seen that the pairs of wheels have their flanges alternately disposed so that one wheel of one pair will engage the chain 50 exteriorly and the other interiorly.

It will be readily seen by reference to Fig. 1 that should the steering wheel pass over an obstruction $x$ the chain belt frame would be permitted to drop and accommodate the resulting rise of the forward end of the radius tractor truck and maintain the chain belt in tractive engagement with the surface throughout the normal length indicated by dimension $y$. It will also be noted that when the tractive chain belt reaches the obstruction $x$ the radius tractor truck will rise toward the main frame, that is the forward end thereof, so as to effectively prevent any buckling stress being imposed upon the frame at points between the pivot shaft 42 and the pivot of the steering wheel 17 while maintaining the proper tractive contact.

It will be observed that by the employment of the load supporting springs 54 positioned intermediate the ends of the truck frame or swinging member, and pivoting the latter concentrically with the axis of the sprocket wheel 47, relative movement is permitted between the swinging member and main frame of the machine without in any manner distorting the chain or track member so that the track member is maintained in active contact with the surface irrespective of the contour of the latter. Obviously the position of the springs 54 may be varied so long as the principles involved are retained. It will be observed that a prompt response to surface irregularities and a maintenance of the steering wheel in contact with the surface is assured.

As will be seen by reference to Figs. 4 and 5, the chain proper, 50, consists of inner and outer links 77 and 78 having inner and outer pivot eyes 79 and 80, disposed in overlapping relation to bring their axes in registry to receive the ends of the pivots 81. The ends of the pivots 81 have suitable heads 82 for maintaining the links in position, as shown in Fig. 4. The pivots 81 mesh with the sprockets of wheels 47 and 53 and the links 77 and 78 have overlapping flat track faces 83 and 84 for engagement with the lower supporting idler wheels and the upper supporting idler wheels. The overlapping arrangement of the track faces 83 and 84, as clearly shown in Fig. 5, serves to present a substantially continuous chain track to the wheels while the chain is disposed in a straight line and the alternate over and underlapping relation, as shown in Fig. 5, permits of the chain taking the curve of the wheel about which it is trained when passing from a lower to an upper position, or vice versa.

The chain 50 is provided with a tread belt 85 which may comprise a plurality of shoes 86 having their rear teminals 87 overlapping the forward terminals 88 of the next nearmost adjacent shoe. The overlapping relation, as clearly shown in Fig. 5, provides a ribbed tractive periphery on the belt which enhances tractive efficiency considerably. I preferably provide a shoe for each link and rigidly connect each shoe to its respective link in any suitable manner such as by rivets 89.

The exterior links 78 are connected with each other by rods 90 so that when the exterior links are held in position their overlapping relation on the outer faces of the links 77 will hold the latter in place.

While I have herein shown and described one specific form of my invention, I do not wish to be limited thereto except for such limitations as the claims may import.

I claim:—

1. In a tractor, and in combination a main frame, a steering wheel normally positioned for load carrying service, a tractor truck mechanism comprising a driving sprocket wheel, a truck frame pivotally mounted concentric with the axis of the sprocket wheel, a tractor chain, a curved idler surface, rollers interposed between the idler surface and the sprocket wheel, and a spring member normally tensioned for load carrying service and positioned intermediate the idler surface and the sprocket wheel.

2. In a track laying tractor, an endless track member, a driving sprocket wheel for the member, a swinging truck member having a pivotal connection concentric with the axis of the sprocket wheel member, means carried by the swinging truck member for engaging the track and for supporting the load, and a spring interposed between the frame of the machine and the swinging truck member for maintaining the active part of the track member in contact with the surface irrespective of the contour thereof while maintaining substantially the normal position of the frame of the machine.

3. In a tractor, the combination of a main frame, a supporting and guiding wheel at the front of the said frame, an elongated tractor frame, a sprocket chain wheel on the tractor frame, at each end thereof, an endless traction chain trained over said sprocket chain wheels, the tractor frame being pivotally connected at its rear end to the rear of the main frame, to permit free up and down movement of the front end of the tractor frame, forward idler wheels rigidly supported on the tractor frame, and rear idler wheels yieldably mounted upon the tractor frame, said forward and rear idlers being arranged intermediate the sprocket chain wheels and supporting a length of the lower run of the endless tractor chain for engagement with the road surface.

4. In a tractor, the combination of a main frame, a supporting and guiding wheel at the front of said frame, an elongated tractor frame, a sprocket chain wheel on the tractor frame, at each end thereof, an endless traction chain trained over said sprocket chain wheels, the tractor frame being pivotally connected at its rear end to the rear of the main frame to permit free up and down movement to the front end of the tractor frame, yieldable means interposed between the main frame and tractor frame, in advance of the pivotal connection of the tractor frame with the main frame, forward idler wheels rigidly supported on the tractor frame, and rear idler wheels yieldably mounted on the tractor frame between the said yieldable means and the pivotal connection of the tractor frame with the main frame, said forward and rear idler wheels engaging and supporting a length of the lower run of the endless traction chain for engagement with the road surface.

In testimony whereof I affix my signature in presence of two witnesses.

CLARENCE LEO BEST.

Witnesses:
MARGARET MACLEOD,
H. W. STALEY.